United States Patent
Ziff et al.

(10) Patent No.: US 11,529,218 B2
(45) Date of Patent: Dec. 20, 2022

(54) SYSTEM AND METHOD FOR CEMENTING PARTS INTO A SCREW RETAINED IMPLANT CROWN

(71) Applicants: David Ziff, Orlando, FL (US); Elese Silva, Orlando, FL (US); Allen L. Thomas, Jr., Orlando, FL (US)

(72) Inventors: David Ziff, Orlando, FL (US); Elese Silva, Orlando, FL (US); Allen L. Thomas, Jr., Orlando, FL (US)

( * ) Notice: Subject to any disclaimer, the term of this patent is extended or adjusted under 35 U.S.C. 154(b) by 0 days.

(21) Appl. No.: 17/382,167

(22) Filed: Jul. 21, 2021

(65) Prior Publication Data

US 2022/0023012 A1   Jan. 27, 2022

Related U.S. Application Data

(60) Provisional application No. 63/056,185, filed on Jul. 24, 2020.

(51) Int. Cl.
    *A61C 8/00* (2006.01)
(52) U.S. Cl.
    CPC ............ *A61C 8/0089* (2013.01); *A61C 8/005* (2013.01); *A61C 8/0012* (2013.01); *A61C 8/0074* (2013.01)
(58) Field of Classification Search
    CPC .................................................. A61C 8/0089
    See application file for complete search history.

(56) References Cited

U.S. PATENT DOCUMENTS

| 1,123,730 | A | * | 1/1915 | Greenfield | A61C 8/0039 433/165 |
| 4,531,916 | A | * | 7/1985 | Scantlebury | A61C 8/0006 433/173 |
| 4,645,453 | A | * | 2/1987 | Niznick | A61C 8/0018 433/173 |
| 4,744,756 | A | * | 5/1988 | Ross | A61C 8/0039 433/173 |

(Continued)

OTHER PUBLICATIONS

Ziff, David et al., PCT Patent Application No. PCT/US21/042824 filed Jul. 22, 2021, Notification of Transmittal of the International Search Report and the Written Opinion of the International Searching Authority, or the Declaration dated Dec. 2, 2021, 15 pages.

*Primary Examiner* — Jacqueline Woznicki
(74) *Attorney, Agent, or Firm* — Brian S. Steinberger; Hilary F. Steinberger; Law Offices of Brian S. Steinberger, P.A.

(57) ABSTRACT

Tools, assemblies, devices, systems, and methods for easily mounting a crown to a titanium (Ti) base or custom abutment with a tool without having to pre-cement a mounting base to a crown and have to physically hold together the base to the crown until the cement is cured. The implant cementation assembly tool does allow the Ti base and crown to be cemented (pre-cemented) without being constantly held and done outside of the mouth. The embodiments can include a bottom (hard rod, such as plastic or metal) that goes through the Ti base and the crown. The embodiments can include a top that is either threaded to allow it to be screwed onto the hard rod or a top that has a hollow center that can slide over (Continued)

the hard rod and be clamped to the rod. A second embodiment uses a modified hemostat tool with lockable pivoting arms to clamp the crown to the Ti base to allow cement to become set.

16 Claims, 18 Drawing Sheets

(56) References Cited

U.S. PATENT DOCUMENTS

| | | | | |
|---|---|---|---|---|
| 4,752,225 A | 6/1988 | Bori | | |
| 5,105,690 A * | 4/1992 | Lazzara | ............... | A61C 8/0089 |
| | | | | 81/436 |
| 5,362,234 A * | 11/1994 | Salazar | ............... | A61C 8/0024 |
| | | | | 433/169 |
| 5,755,575 A * | 5/1998 | Biggs | ................... | A61C 8/0087 |
| | | | | 206/63.5 |
| 5,951,287 A * | 9/1999 | Hawkinson | ........... | A61C 8/0089 |
| | | | | 433/173 |
| 6,039,568 A * | 3/2000 | Hinds | .................. | A61C 8/0036 |
| | | | | 433/175 |
| 6,247,933 B1 * | 6/2001 | Wagner | .................. | A61C 8/008 |
| | | | | 433/173 |
| 6,537,069 B1 * | 3/2003 | Simmons, Jr. | ....... | A61C 8/0022 |
| | | | | 433/173 |
| 6,540,514 B1 * | 4/2003 | Falk | ..................... | A61C 8/0001 |
| | | | | 433/172 |
| 6,923,648 B1 * | 8/2005 | Rassoli | ............... | A61C 8/0087 |
| | | | | 433/173 |
| 10,238,471 B2 | 3/2019 | Chan | | |
| 10,390,908 B2 | 8/2019 | Marlin | | |
| 2002/0004189 A1 * | 1/2002 | Hurson | .................. | A61C 8/005 |
| | | | | 433/172 |
| 2004/0175673 A1 * | 9/2004 | Zickman | ............... | A61C 8/0069 |
| | | | | 433/173 |
| 2011/0123952 A1 * | 5/2011 | Grabosch | ............. | A61C 8/0018 |
| | | | | 433/174 |
| 2013/0309632 A1 * | 11/2013 | Sanders | ............... | A61C 8/0022 |
| | | | | 433/174 |
| 2018/0021109 A1 | 1/2018 | Rodrigues et al. | | |
| 2018/0036053 A1 * | 2/2018 | Toscano | ............... | A61C 8/0062 |
| 2019/0282339 A1 | 9/2019 | Fischler et al. | | |
| 2019/0282340 A1 * | 9/2019 | Christiansen | .......... | A61C 8/005 |

* cited by examiner

FIG. 7
FIG. 8
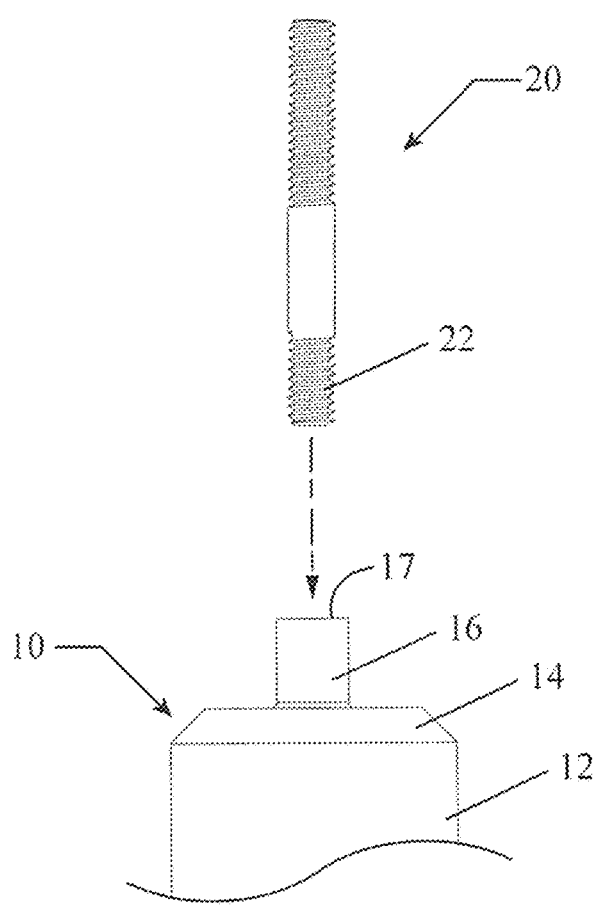
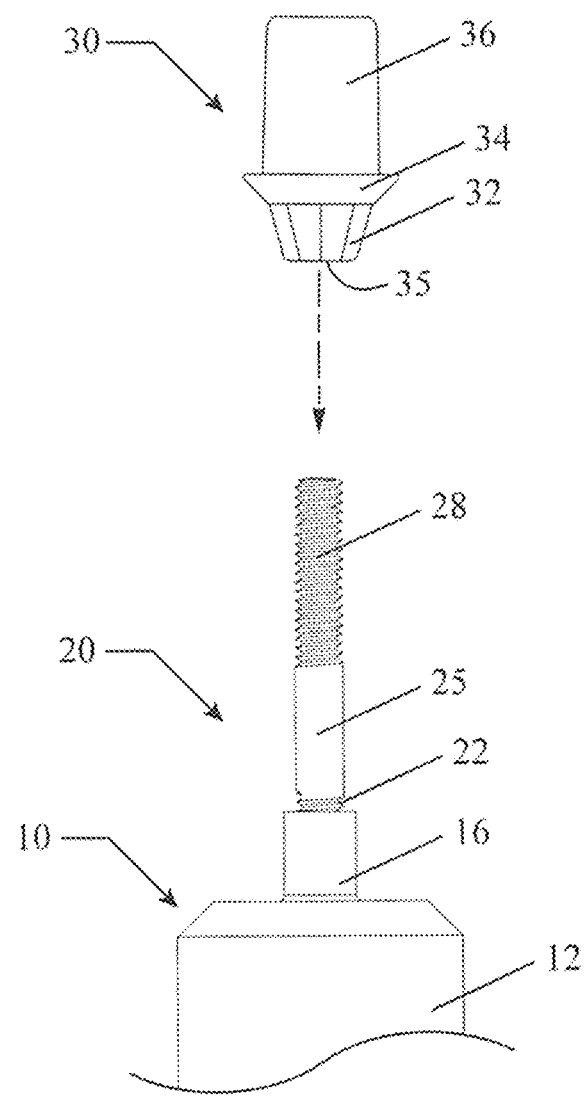

FIG. 9
FIG. 10
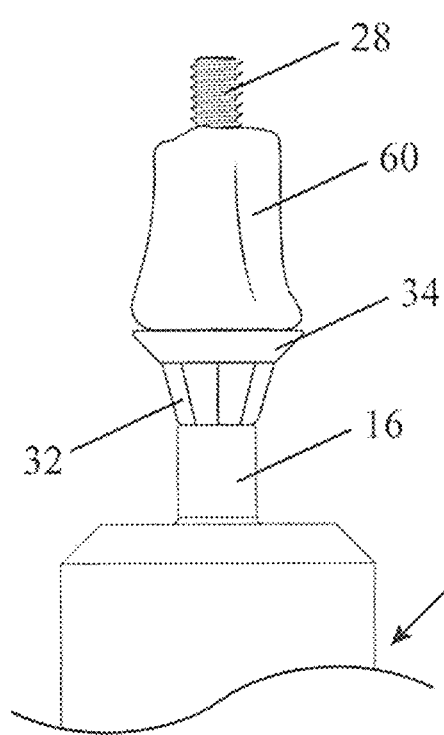
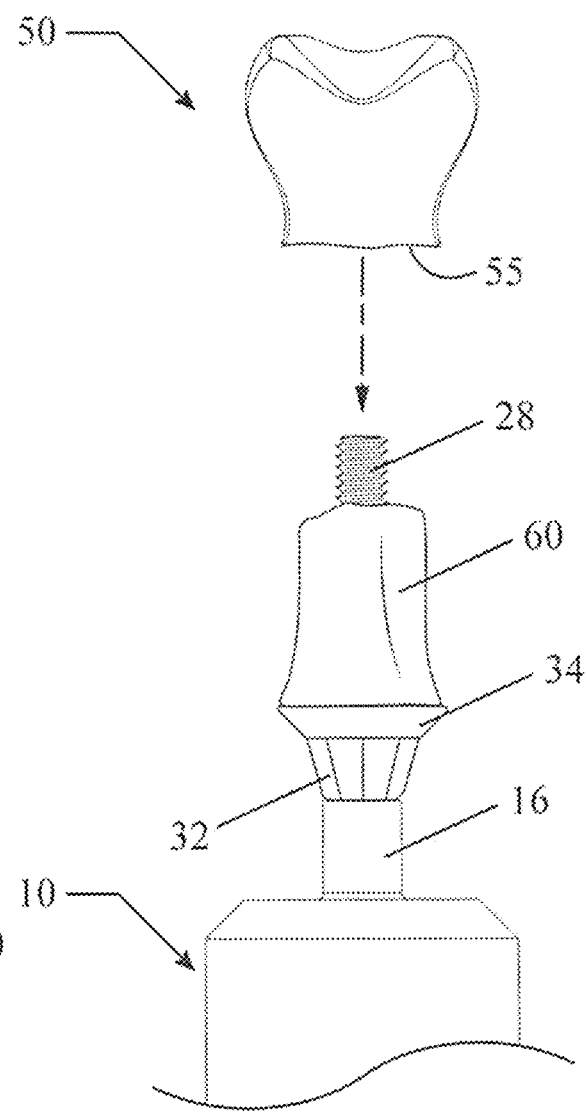

SYSTEM AND METHOD FOR CEMENTING PARTS INTO A SCREW RETAINED IMPLANT CROWN

CROSS REFERENCE TO RELATED APPLICATIONS

This application claims the benefit of priority to U.S. Provisional Application Ser. No. 63/056,185 filed Jul. 24, 2020. The entire disclosure of the applications listed in this paragraph is incorporated herein by specific reference thereto.

FIELD OF INVENTION

This invention relates to dentistry, and in particular to tools, assemblies, devices, systems, and methods for easily mounting a crown to an implant abutment or implant Ti (titanium) Base tool without to physically hold together the abutment/Ti Base to the crown until the cement is cured.

BACKGROUND AND PRIOR ART

In the dental field a common way of attaching a crown to an implant mounted in the jaw is to require a pre-mounting a titanium (Ti) base to a crown by cementing the titanium base into a lower facing opening the crown by inserting cement about the base so that the titanium base will stay attached to the crown.

Generally, the dentist or their assistants will have to physically hold the crown to the titanium base or abutment until the cement cures and the base has become fixed to the crown. Finally, the dentist will attach the crown with the 25 secured base to the implant by screwing the crown with the secured base into the implant with a screw having screw threads that pass through a pre-existing channel opening in the crown and channel in the base and finally threadably attach to the implant.

Problems with this procedure include the amount of time it takes for the dentist to have to physically hold the titanium base to the crown until the cement is cured.

Additionally, holding the crown to the base can be difficult since the titanium base may not easily sit within the lower opening inside the crown, and can easily become unevenly held in place. The tops of the crowns are not at the same height so that applying pressure on the top of the uneven surfaces of the crown while pinching the bottom of the base in place can cause the base to not seat evenly inside the lower opening of the crown.

The usual way of attaching the crown to a base with cement and then screwing the crown and base to the implant requires time, dexterity and patience and is prone to human error to occur.

Thus, the need exists for solutions to the above problems with the prior art.

SUMMARY OF THE INVENTION

A primary objective of the present invention is to provide tools, assemblies, devices, systems, and methods for easily mounting a crown to a Ti (titanium) base or abutment without having to pre-cement a mounting base to a crown and have to physically hold together the base to the crown until the cement is cured.

A secondary objective of the present invention is to provide tools, assemblies, devices, systems, and methods for easily mounting a crown to a Ti (titanium) base or abutment to accurately cement the crown to the Ti base and not on a model, which can allow the dentist to visually inspect that the fit is accurate and perfect.

A third objective of the present invention is to provide tools, assemblies, devices, systems, and methods for easily mounting a crown to an implant abutment/Ti (titanium) base and does not have to be constantly held by dental, technician, or dental assistant, to ensure that the fit between the Ti base and crown is accurate and perfect.

A fourth objective of the present invention is to provide tools, assemblies, devices, systems, and methods for easily mounting a crown to an implant abutment/Ti (titanium) base and allows the fit between the Ti base and crown to be inspected and verified with a 360-degree view.

A fifth objective of the present invention is to provide tools, assemblies, devices, systems, and methods for easily mounting a crown to an implant abutment/Ti (titanium) base that allows for any excess cement to be cleaned from the adjoining seam before the cement hardens and becomes difficult to clean.

The device, system and method are designed and developed to help facilitate the cementing of screw retained implant restorations.

A screw retained crown can include:
Part 1, a crown;
Part 2, A Ti Base or custom abutment; and
Part 3, A screw.

There is a channel through the crown so that the screw can pass through. The screw is then threaded into an implant that is anchored in a jaw bone (upper or lower jaw bone).

Cementing the parts together becomes the key to a successful completion of the entire procedure. Currently there are no tools available to predictably and consistently cement the parts together.

A first embodiment can include a method of cementing a crown to an abutment/Ti (titanium) base, can include the steps of: providing a Ti Base having a through-hole therethrough; providing a crown having a through-hole cavity therethrough; providing a handle having an upper end; providing a threaded rod; securing one end of the threaded rod to the upper end of the handle; mounting the Ti Base over another end of the threaded rod; and securing the crown to the mounted Ti Base.

The step of providing the Ti Base can include the steps of providing the Ti Base with a ring shaped base having an inverted cone shape; providing a bottom extending end from the ring shaped base; providing an upwardly extending chimney portion from the ring shaped base; and providing a hollow interior through the Ti base.

The step of providing the bottom extending end can include the step of: providing the bottom extending end having a hex shape.

The step of securing the one end of the threaded rod to the upper end of the handle can include the step of threading the one end of the threaded rod into a socket in an upper portion of the handle.

The step of securing the crown to the mounted Ti Base can include the steps of: applying cement to an exposed portion of the threaded rod; and cleaning excess cement from secured crown and Ti Base.

The method can further include the step of providing a driver tool for the step of securing the crown to the mounted Ti Base.

The step of providing the driver tool can include the step of providing the driver tool with an elongated member having an inverted cone shape lower end, and a threaded socket in the lower end.

The method can further include the step of screwing the screw retained crown into an implant located in a jaw.

The step of providing the handle can include the step of providing the socket in the upper end with a threaded interior surface.

The first embodiment can include a system of forming a screw retained crown and, can comprise: a Ti Base having a through-hole therethrough, and a crown having a through-hole cavity therethrough. A handle having an upper end; a threaded rod extending upward from the handle, wherein the Ti Base is fit over the threaded rod, and the crown is fit over the threaded rod and secured to the Ti Base.

The Ti Base can include a ring shaped base having an inverted cone shape; a bottom extending end from the ring shaped base; an upwardly extending chimney portion from the ring shaped base; and a hollow interior through the Ti base.

The bottom extending end can include a hex shape.

One end of the threaded rod is screwed into a top of the handle.

The system can further comprise cement applied about an upper portion of the Ti Base before the crown is fit over a top of the threaded rod before the crown is fit over the threaded rod.

The system can further comprise a driver tool for securing the crown to the mounted Ti Base.

The driver tool can include an elongated member having an inverted cone shape lower end, and a threaded socket in the lower end for threading over the top of the threaded rod until the lower end drives the crown to seat against the Ti Base.

A second embodiment can use a hemostat tool having a first arm with the threaded rod pivotally attached to a second arm having the driver plug, where the crown can be clamped in place until the cement is cured.

The hemostat tool can have locking members which allow the hemostat to be locked in a specific clamped position Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 7 shows the first step of screwing the threaded rod into the handle.

FIG. 8 shows the second step of placing the chimney (ti base) on the assembled parts shown in FIG. 7.

FIG. 9 shows the third step of mixing cement and placing on the chimney (ti base) shown in FIG. 8.

FIG. 10 shows the fourth step of placing the crown shown in FIG. 6 on cement placed on the chimney (ti base) shown in FIG. 9.

DESCRIPTION OF THE PREFERRED EMBODIMENTS

Figure 1:
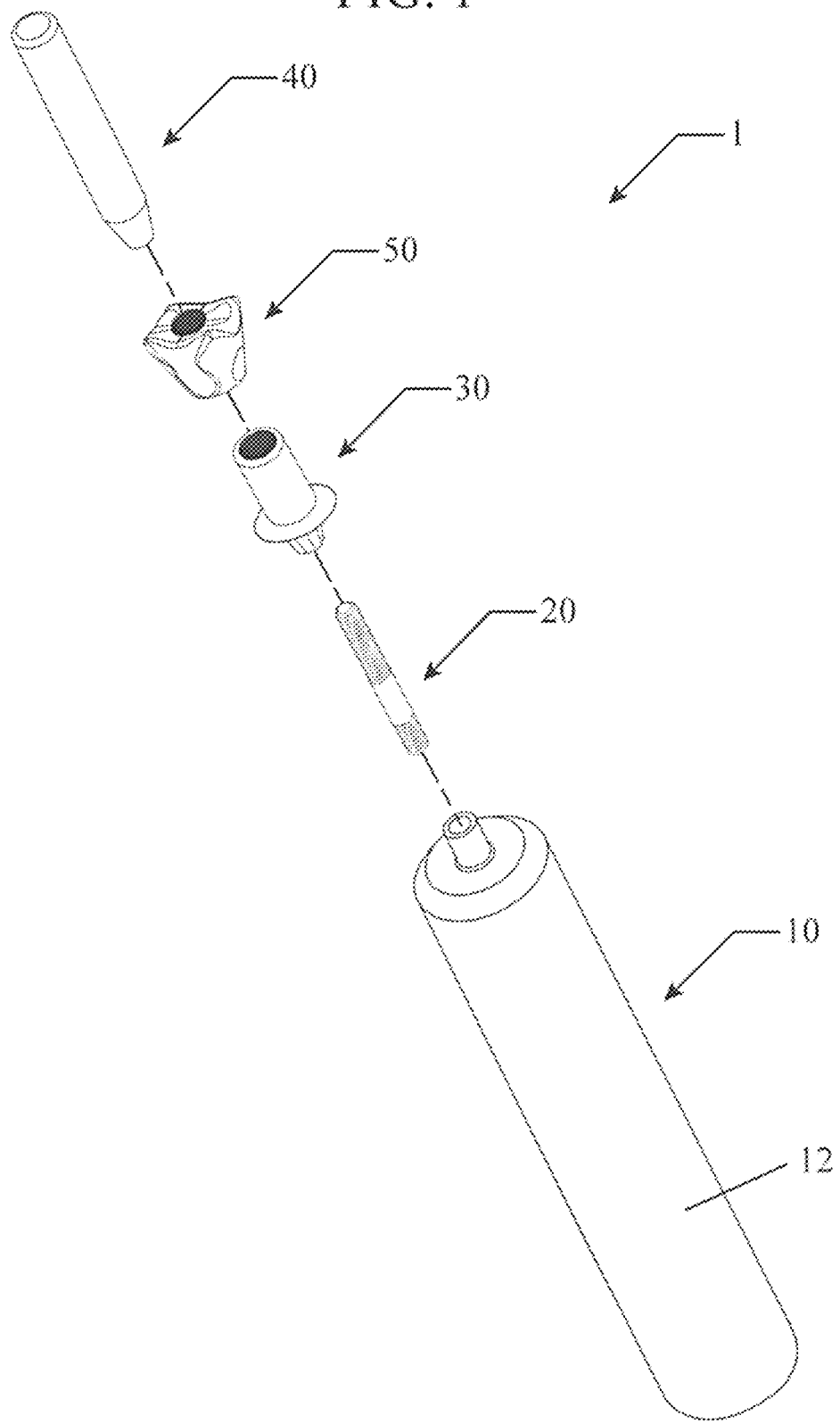
FIG. 1 is an exploded view of the components in the assembly including a handle, threaded rod, chimney (ti base), crown and driver plug used in the invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.
1 assembly
10 handle
12 cylindrical portion
14 upper end
16 protruding tip
17 socket
20 threaded post/rod
22 lower end
25 midportion
28 upper end
30 chimney (ti base)
32 bottom extending end
34 ring shaped ledge base having inverted cone shape
36 upwardly extending chimney portion
35 hollow interior
38 upwardly extending chimney portion
40 driver tool/plug
42 lower end with inverted cone shape
43 socket
45 elongated midportion
48 top end
50 crown
55 elongated through-hole cavity
60 cement
70 tooth
75 cavity
76 implant in bone
80 screw
100 Second Embodiment Assembly
110 first hemostat arm
116 first loop grip end
118 lock tab on first hemostat arm
120 second hemostat arm with threaded rod end
122 exterior threads on threaded rod
126 second loop grip end
128 lock tab on second hemostat arm
130 pivot pin for first hemostat arm and second hemostat arm
140 attachable driver plug
142 lower end with inverted cone shape
143 socket First Embodiment FIG. 1 is an exploded view of the components in the assembly 1 including a handle 10, threaded rod 29, chimney (ti base) 30, crown 50 and diver plug 40 used in the invention.

Figure 2:
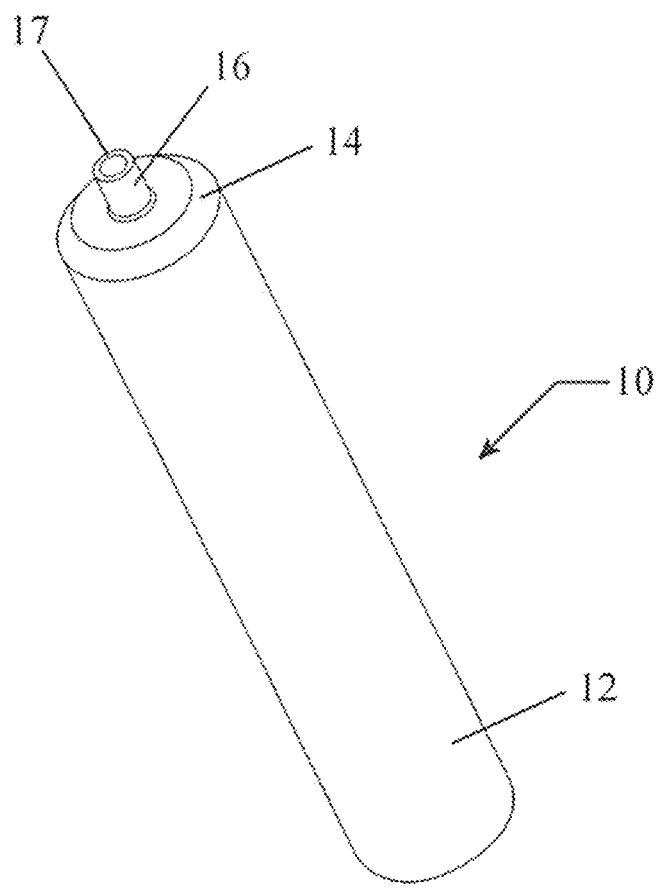
FIG. 2 is an enlarged perspective view of the handle shown in FIG. 1.

FIG. 2 is an enlarged perspective view of the handle 10 shown in FIG. 1. The handle 10 can include an elongated cylindrical portion 12, with an upper end 14 and upwardly protruding tip 16 with socket 17.

Socket 17 has internal threaded walls to allow the threaded rod/post 20 to be screwed in.

The handle 10 can be formed from injection molded plastic, and the like. The handle 10 can be machined from aluminum, titanium, steel, and the like. Handle 10 can have a length of approximately 4 Inches and fit comfortably in a hand, and have a diameter of at least approximately % inch so the device is stable when put down. Handle 10 can have different lengths and other diameters as needed.

The tip 16 can have an upwardly protruding length of approximately ##??inches.

Figure 3:
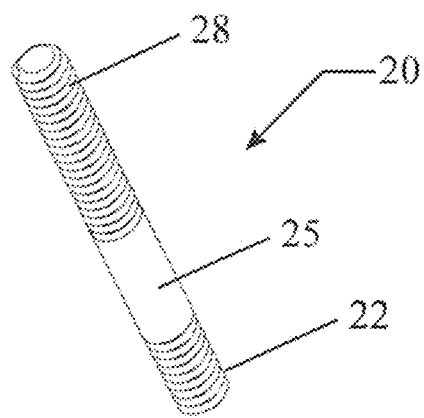
FIG. 3 is an enlarged perspective view of the threaded rod shown in FIG. 1.

FIG. 3 is an enlarged perspective view of the threaded rod 20 shown in FIG. 1.

The threaded rod 20 can have a length that is not fixed.
The threaded rod 20 can be formed from titanium, stainless steel, and the like.

The threaded rod 20 can have a lower end 22 having an external threaded surface, a midportion 25 with a smooth surface, and an upper end 28 with an external threaded surface. The entire outer surface of threaded rod 22 can be completely threaded with an external threaded surface.

Figure 4:
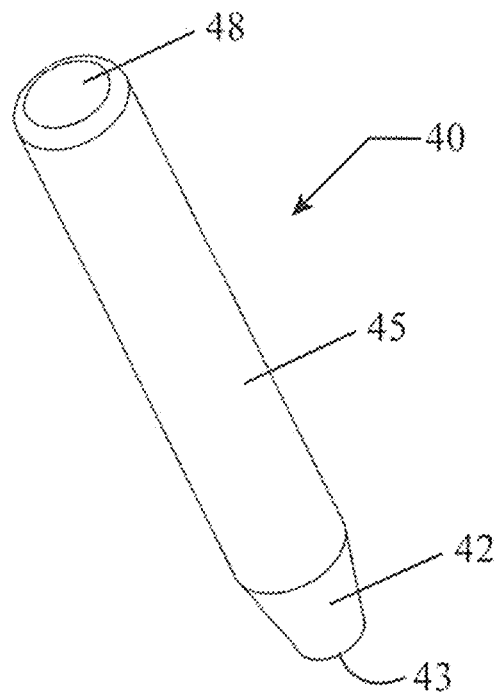
FIG. 4 is an enlarged perspective view of the driver plug shown in FIG. 1.

FIG. 4 is an enlarged perspective view of the driver plug 40 shown in FIG. 1. Driver tool/plug 40 can have a lower end 42 having an inverted cone shape with socket 43 having an internal threaded surface. An elongated cylindrical midportion 45 for being held by the user can have a top end 45 that is generally smooth, or can be textured.

Figure 5:
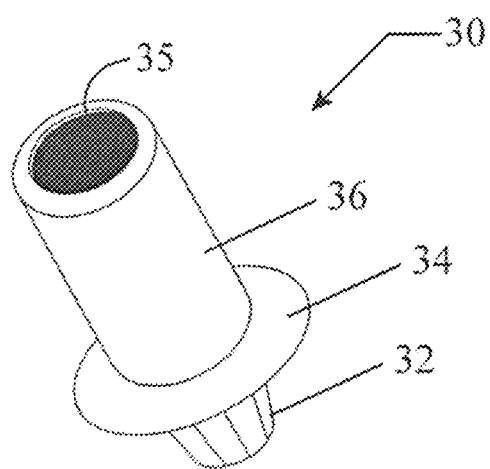
FIG. 5 is an enlarged perspective view of the chimney (ti base) shown in FIG. 1.

FIG. 5 is an enlarged perspective view of the chimney (ti base) 30 shown in FIG. 1.

Chimney (ti base) 30 can be formed from titanium, and have an overall length that varies depending on the manufacturer. The common feature for the Chimney (Ti base) 30 is that they all are hollow and have a channel that allows a screw to be passed therethrough.

An example of a Chimney (Ti base) 30 can have dimensions of the chimney portion 36 having a height of approximately 6 mm. The bottom extending end 32 (hex portion) can have a height of approximately 2 mm to approximately 3 mm.

The type of Chimney (Ti base) 30 used can differ to be adaptable to be different lengths and widths The bottom extending end 32 (hex portion) can have different shapes, such as but not limited to square, pentagon, triangular and conical, and the like. Again, the common feature for the Chimney (Ti base) 30 used is to be hollow or with a channel inside.

Chimney (Ti base) 30 can have a bottom extending end 30 having a hexagon outer perimeter surface, underneath a ring shaped ledge base 34.

An upwardly extending chimney portion 36 extends upward from the ring shaped base 34 for a length depending on the Chimney (Ti base) 30 used.

Chimney (Ti base) 30 can have a hollow interior 35 running through the upwardly extending chimney portion 36 through the ring shaped base 34 and through the bottom extending end 30.

Figure 6:
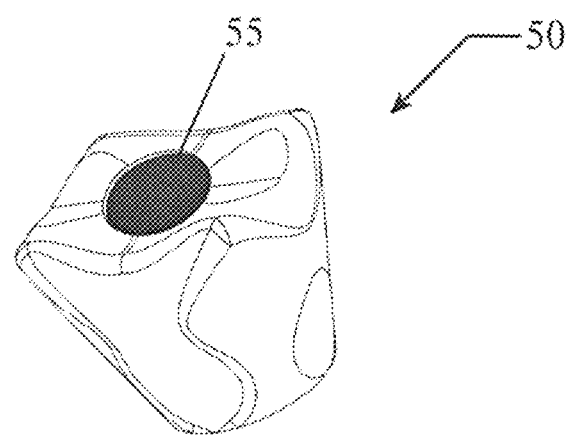
FIG. 6 is an enlarged perspective view of the crown shown in FIG. 1.

FIG. 6 is an enlarged perspective view of the crown 50 shown in FIG. 1. The crown 50 can have an elongated through-hole cavity 55 extending from the top of the crown 50 through the bottom of the crown 50.

FIG. 7 shows the first step of screwing the threaded rod 20 into the handle 10. The lower threaded end 22 of the threaded rod 20 is threaded into the interior threaded surface of the socket 17 in the protruding tip 16 of handle 10 until it is seated.

FIG. 8 shows the second step of placing the chimney (Ti base) 30 on the assembled parts 10, 20 shown in FIG. 7. The bottom extending end 32 of the chimney (Ti base) 30 is fit over the top of the upper end 28 of the threaded rod 20 so that the hollow interior 35 fits about the threaded rod 20.

FIG. 9 shows the third step of mixing cement 60 and placing it around the upper end of the threaded rod 20 above the ring shaped ledge base 34 of the chimney (Ti base) 30 shown in FIG. 8.

FIG. 10 shows the fourth step of placing the crown 55 shown in FIG. 6 so that the elongated through-hole cavity 55 in the bottom of the crown 50 slides over the top of the upper end 28 of the threaded rod 20 with the mixed cement 60 placed on upper end 28 of the threaded rod and the ring-shaped ledge base 34 of the chimney (ti base) shown in FIG. 9.

The user/installer will need to clean off excess cement 60 and physically inspect the seal between the crown 55 and the ring shaped ledge base 34 to verify it is perfect. This can also be done after the steps shown in FIGS. 10 and 11 and/or 12 below.

Figure 11:
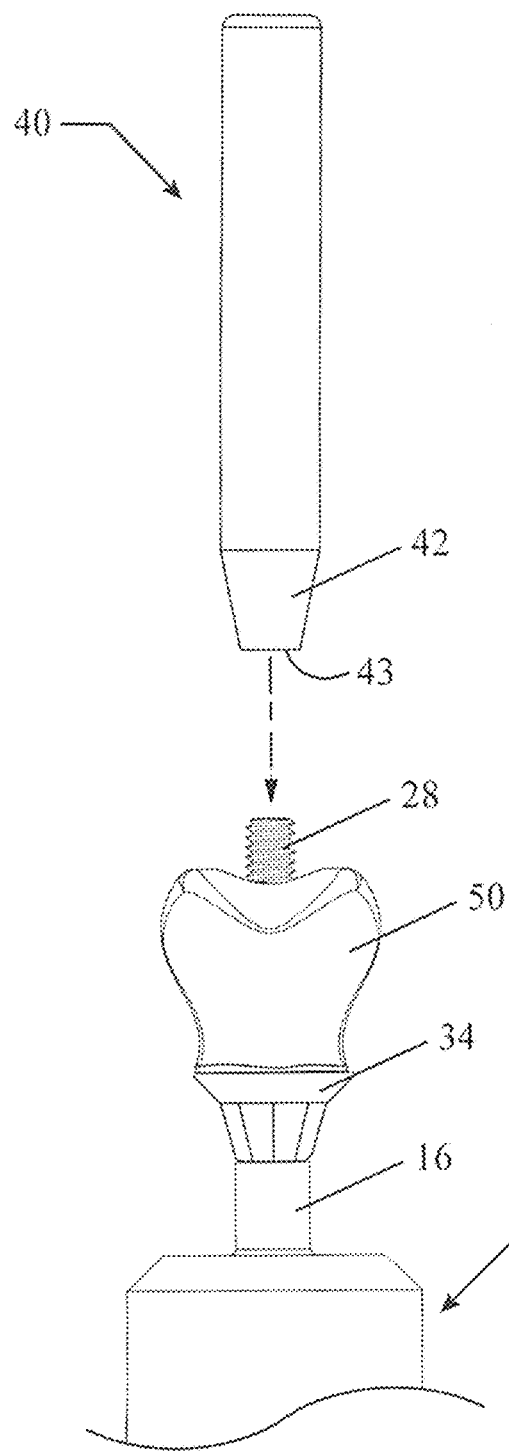
FIG. 11 shows the driver plug shown in FIG. 4 about to thread about the top of the threaded rod shown in FIG. 10.

FIG. 11 shows the driver plug shown in FIG. 4 about to thread about the top of the threaded rod 28 shown in FIG. 10. The installer places the socket 43 of the lower end 42 with inverted cone shape of the driver plug 40 and rotates (screws down) the socket 43 about the threaded exterior of the upper end 28 of the threaded rod 20 until crown 50 is held snugly in place.

Figure 12:
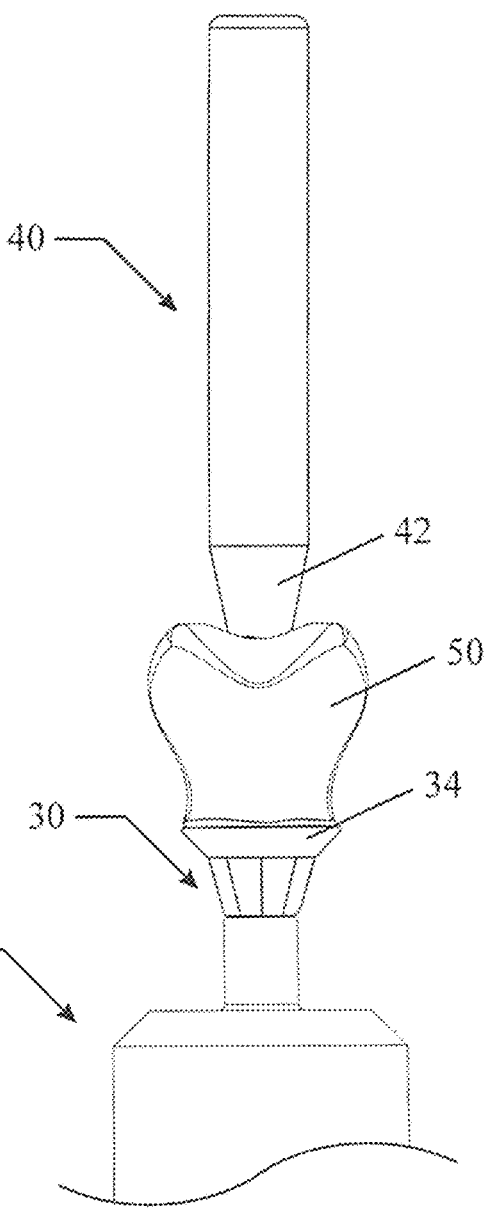
FIG. 12 shows the nest step of cleaning off excess cement and visually inspecting the seal with the crown shown in FIG. 11.

FIG. 12 shows the next step of cleaning off excess cement and visually inspecting the seal between the ring shaped ledge base 34 and the bottom of the crown 50 shown in FIG. 11.

Figure 13:
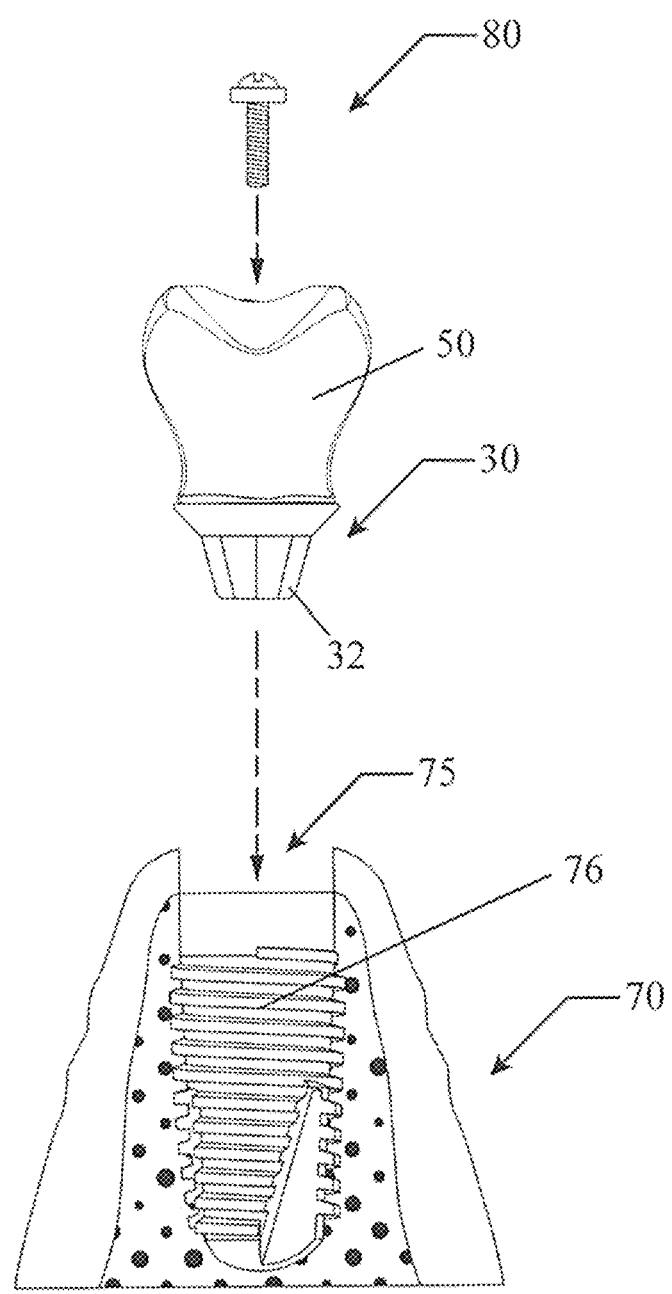
FIG. 13 shows the final step of mounting the crown to the tooth.

FIG. 13 shows the final step of mounting the crown 50 with chimney (ti base) 30 to the tooth 70

The crown 50 with cemented on chimney (Ti base) 30.

The implant can be anchored to the jaw by a screw 80 that passes through crown 50 and bottom extending end 32 of Ti base 30 and screwed into cavity 70 of implant 76 in the bone.

Approximately 4-6 months later the implant can be fixed in the jaw and a screw retained crown can be created and screwed into place. After the implant is surgically implanted, the jaw can be allowed to heal so that the surrounding jaw bone grows about the implant and anchors the implant in place.

Second Embodiment

Figure 14:
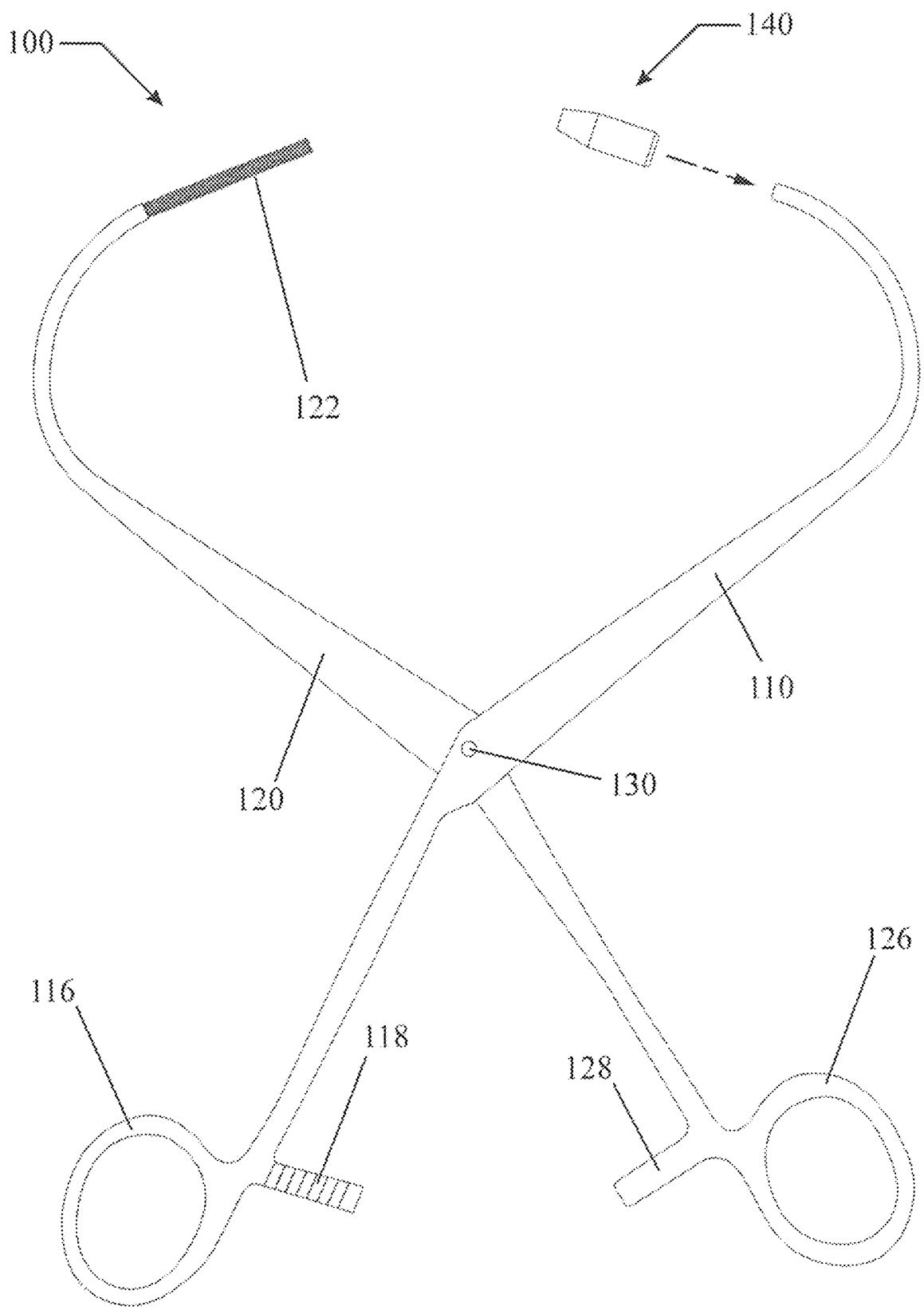
FIG. 14 is an exploded view of components in a second embodiment assembly of the hemostat tool with threaded rod end and attachable driver plug.

FIG. 14 is an exploded view of components in a second embodiment assembly 100 with pivotal arms 110, 120 pivotal by pivot pin 130. An attachable driver plug 140 can be attachable and detachable from the outer end of a first arm 110, having an opposite first loop grip end. A threaded rod end 122 can be formed in an outer end the second arm 120 with an opposite second loop grip end Pivoting arms 110, 120 and pivot pin 130 can be formed from metal, such as but not limited to stainless steel, galvanized steel, aluminum and the like.

The threaded rod end 122 will be screwed into outer end of arm 120 when the arm 120.

Additionally, threaded rod 122 can be formed from other materials, such as but not limited to aluminum, titanium and the like.

Alternatively, the threaded rod end 122 can be screwed into the outer end of the arm 120.

The first pivotal arm 110 can have an inwardly protruding tab 118 with raised ridges or grooves, that can lock with an inwardly protruding tab 128 on the second arm 120 and lock to set positions when the first loop grip end 116 is clamped against the second loop grip end 126.

Figure 15:
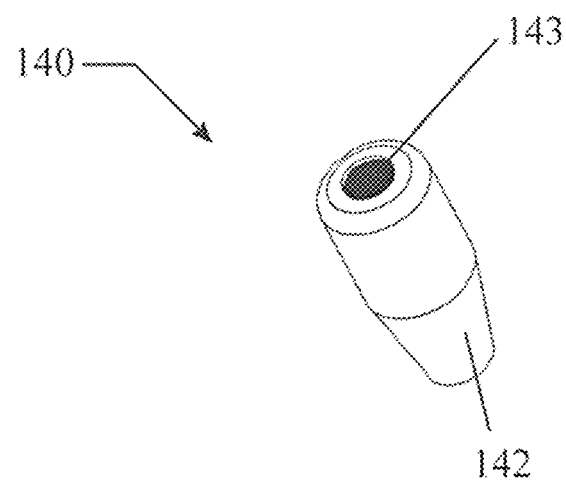
FIG. 15 is an upper front perspective view of the driver plug shown in FIG. 14.
Figure 16:
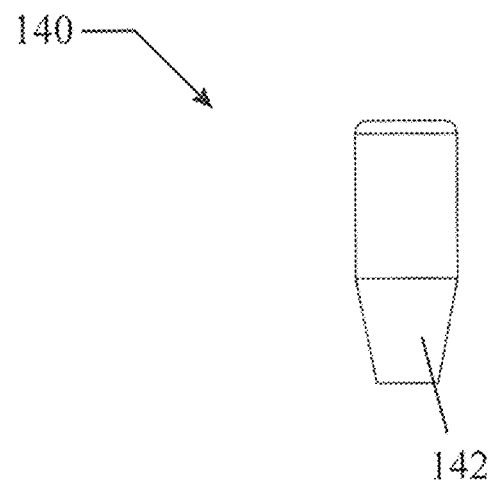
FIG. 16 is a front view of the driver plug shown in FIGS. 14-15.

FIG. 15 is an upper front perspective view of the driver plug 140 shown in FIG. 14. FIG. 16 is a front view of the driver plug 140 shown in FIGS. 14-15.

Referring to FIGS. 15-16, driver plug 140 can be similar in shape and smaller in both diameter and length from driver tool/plug 40.

Driver plug 140 can be formed from material, such as but not limited to nylon, plastic, elastomers, and the like, have a socket 143, that allows the driver plug 140 to be fit about to be both attachable and detachable to exposed end of arm 110.

The opposite end of driver plug 140 can have lower end with an inverted cone shape 14, and have a flat tip surface.

Figure 17:
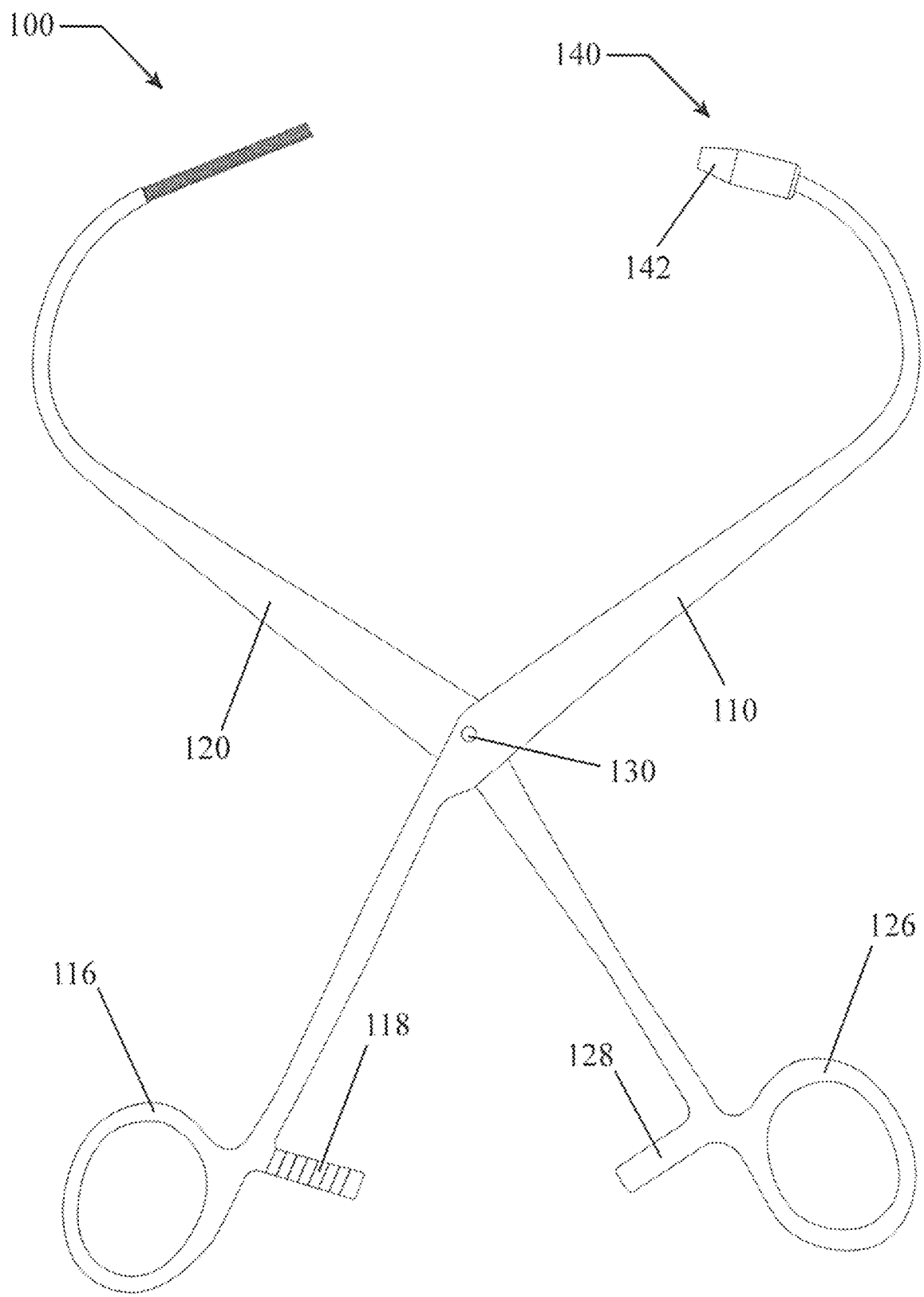
FIG. 17 is a view of the second embodiment components of FIG. 14 with the drover plug attached to the hemostat tool.

FIG. 17 is a view of the second embodiment 100 components of FIG. 14 with the drover plug 140 attached to the outer end of the first arm 110 of the pivoting arms 110, 120 of the hemostat tool.

Figure 18:
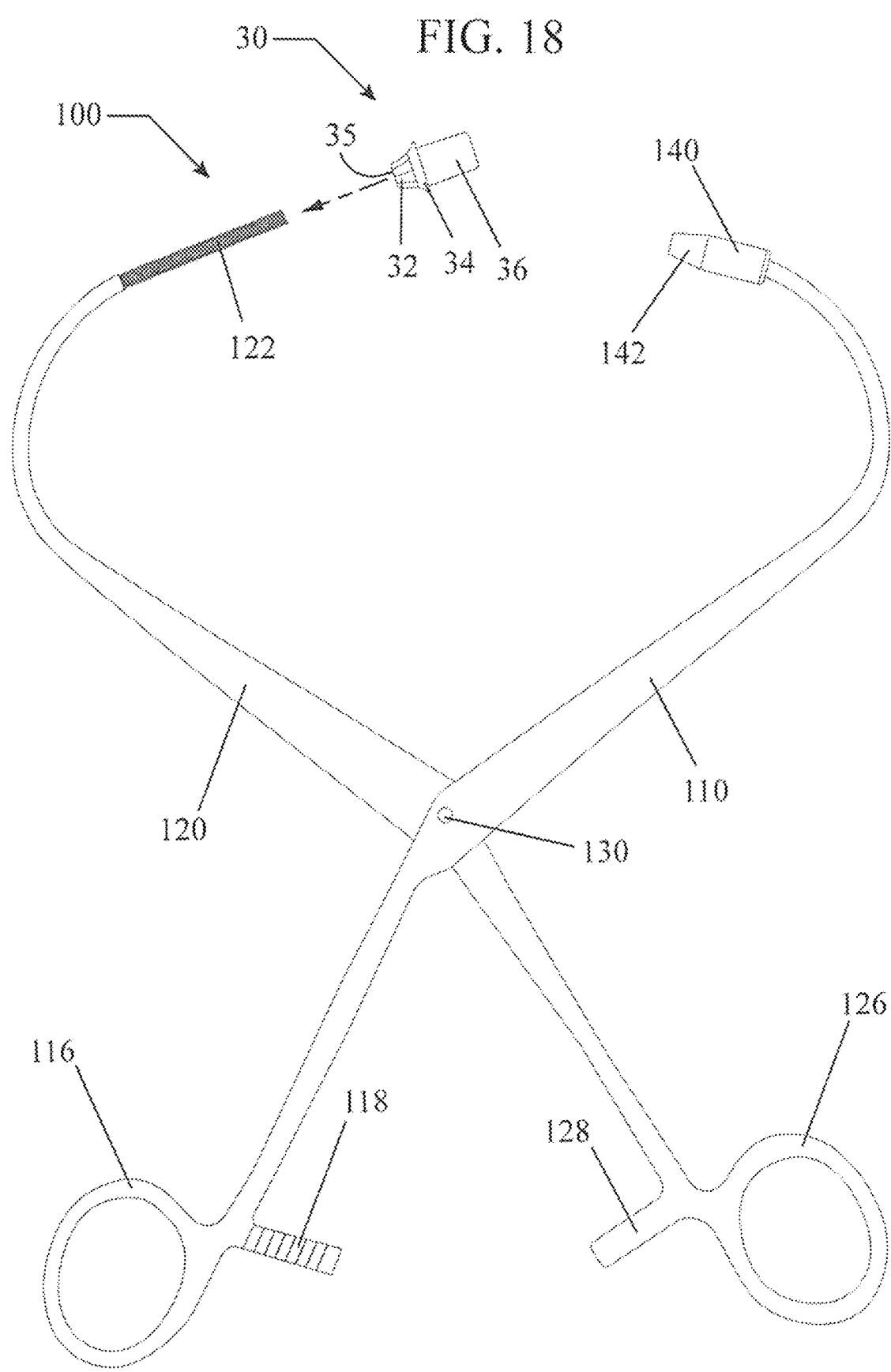
FIG. 18 is another view of the second embodiment components of FIG. 14, with the chimney (ti base) about to attached to the threaded rod on the hemostat tool.

FIG. 18 is another view of the second embodiment 100 components of FIGS. 14, 17 with the chimney (ti base) 30 about to attached to the threaded rod 122 of the second arm 120 that pivots with the first arm 110 on the hemostat tool.

Figure 19:
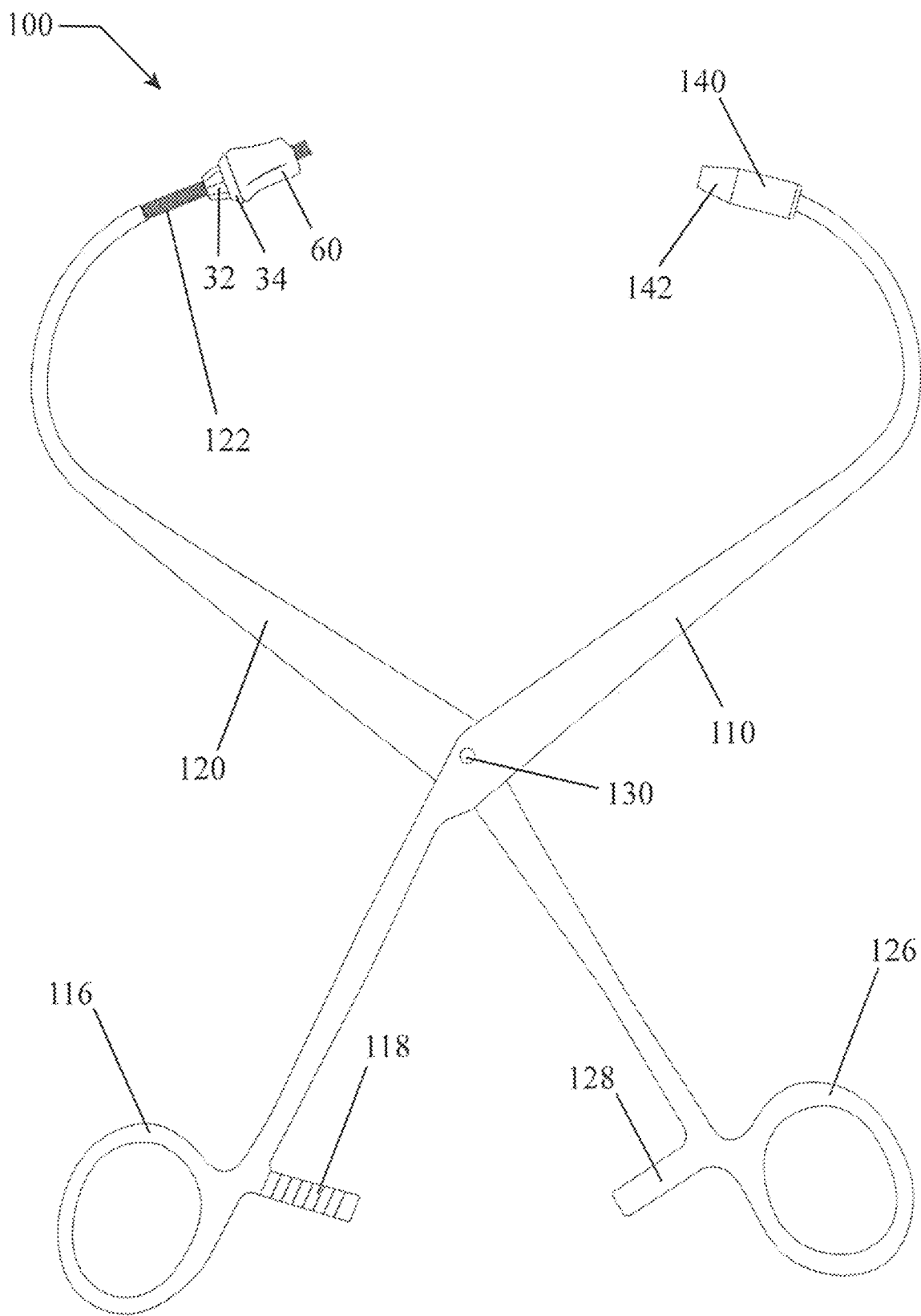
FIG. 19 shows the chimney (ti base) attached to the threaded rod on the hemostat tool shown in FIG. 17.

FIG. 19 shows the chimney (ti base) 30 attached to the threaded rod 122 on the second arm 120 of the hemostat tool shown in FIG. 17.

From this point on, the second embodiment can use similar descriptions that were applied in the first embodiment.

Referring to FIGS. 18-19, the bottom extending end 32 of the chimney (Ti base) 30 is fit over the top of the threaded rod 122 so that the hollow interior 35 fits about the threaded rod 122.

Referring to FIGS. 18-19, mixing cement 60 and placed about the upper extending chimney portion 36 above the ring shaped ledge base 34 of the chimney (ti base) 30.

Figure 20:
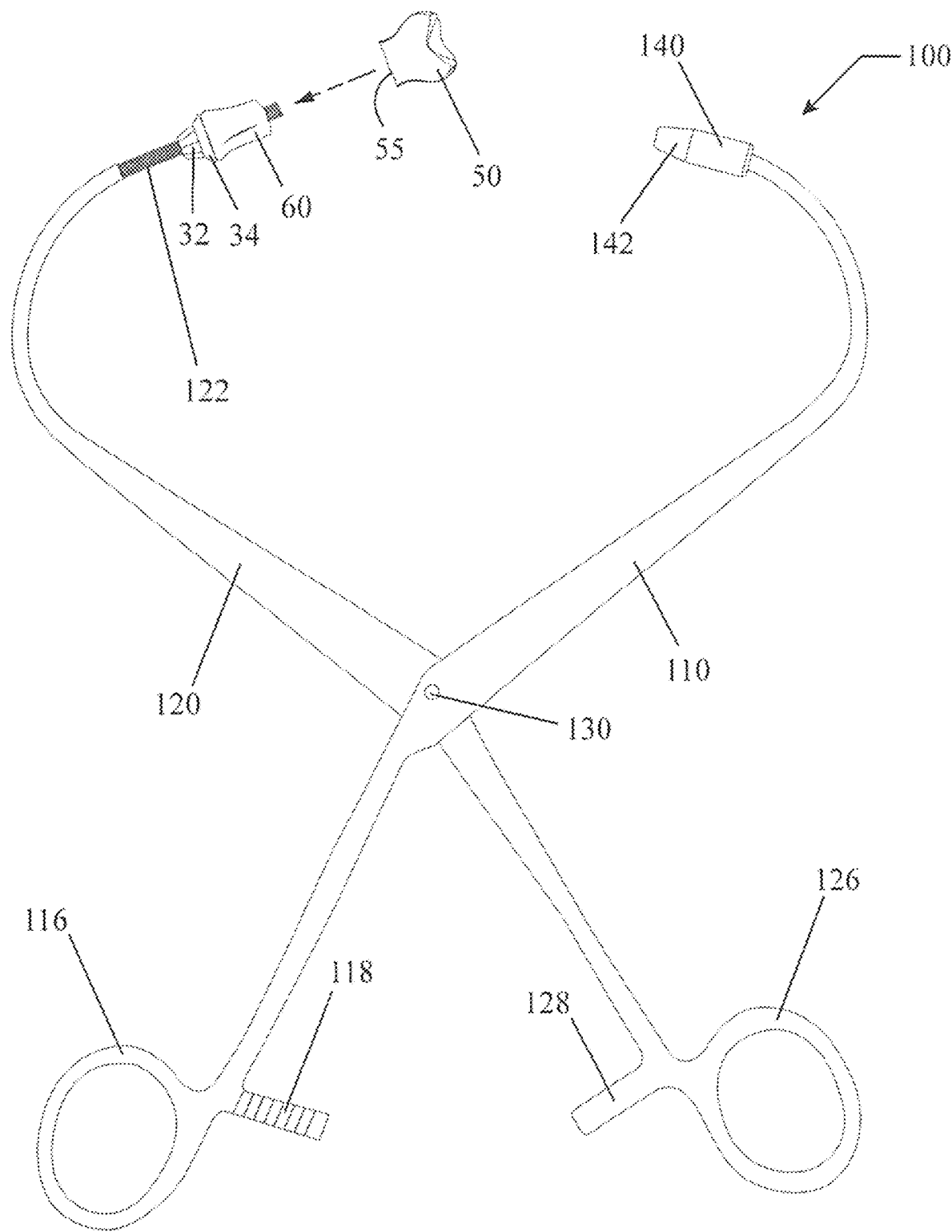
FIG. 20 shows a crown about to be attached to the outer end of the threaded for on the hemostat tool shown in FIG. 20.

FIG. 20 shows a crown 50 about to be attached to the outer end of the threaded 122 on the second arm 120 of the hemostat tool shown in FIG. 20.

Similar to FIG. 10, the elongated through-hole cavity 55 in the bottom of the crown 50 slides over the top of the upper end of the threaded rod 122 with the mixed cement 60 placed on the threaded rod 122 and the ring-shaped ledge base 34 of the chimney (ti base) 30 shown in FIG. 9.

Figure 21:
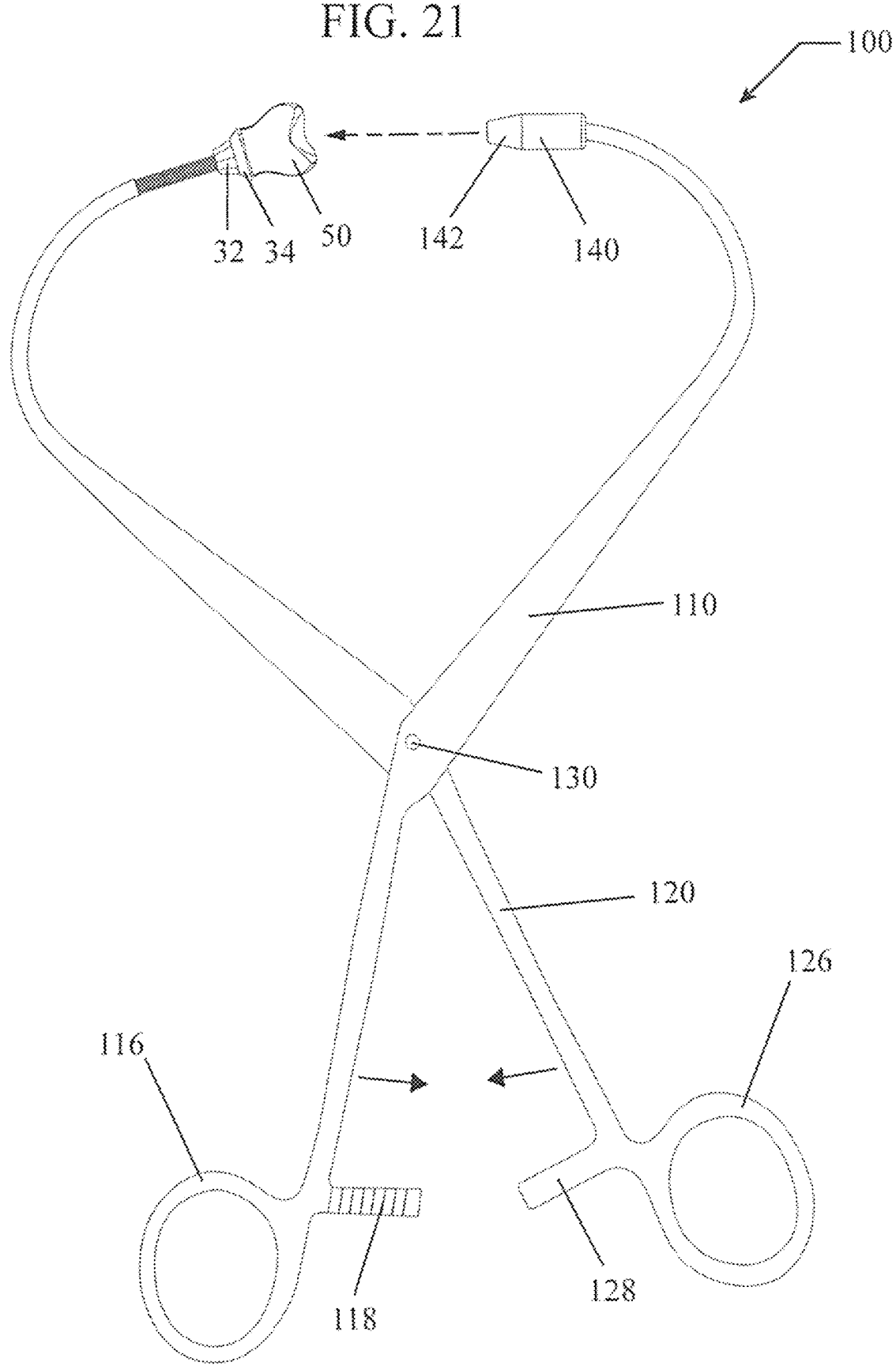
FIG. 21 shows the crown on the threaded on the hemostat tool shown in FIG. 20.

FIG. 21 shows the crown 50 on the threaded rod 122 against the ring-shaped ledge base 34 of the chimney (ti base) 30.

The user/installer will need to clean off excess cement 60 and physically inspect the seal between the crown 55 and the ring shaped ledge base 34 to verify it is perfect.

Figure 22:
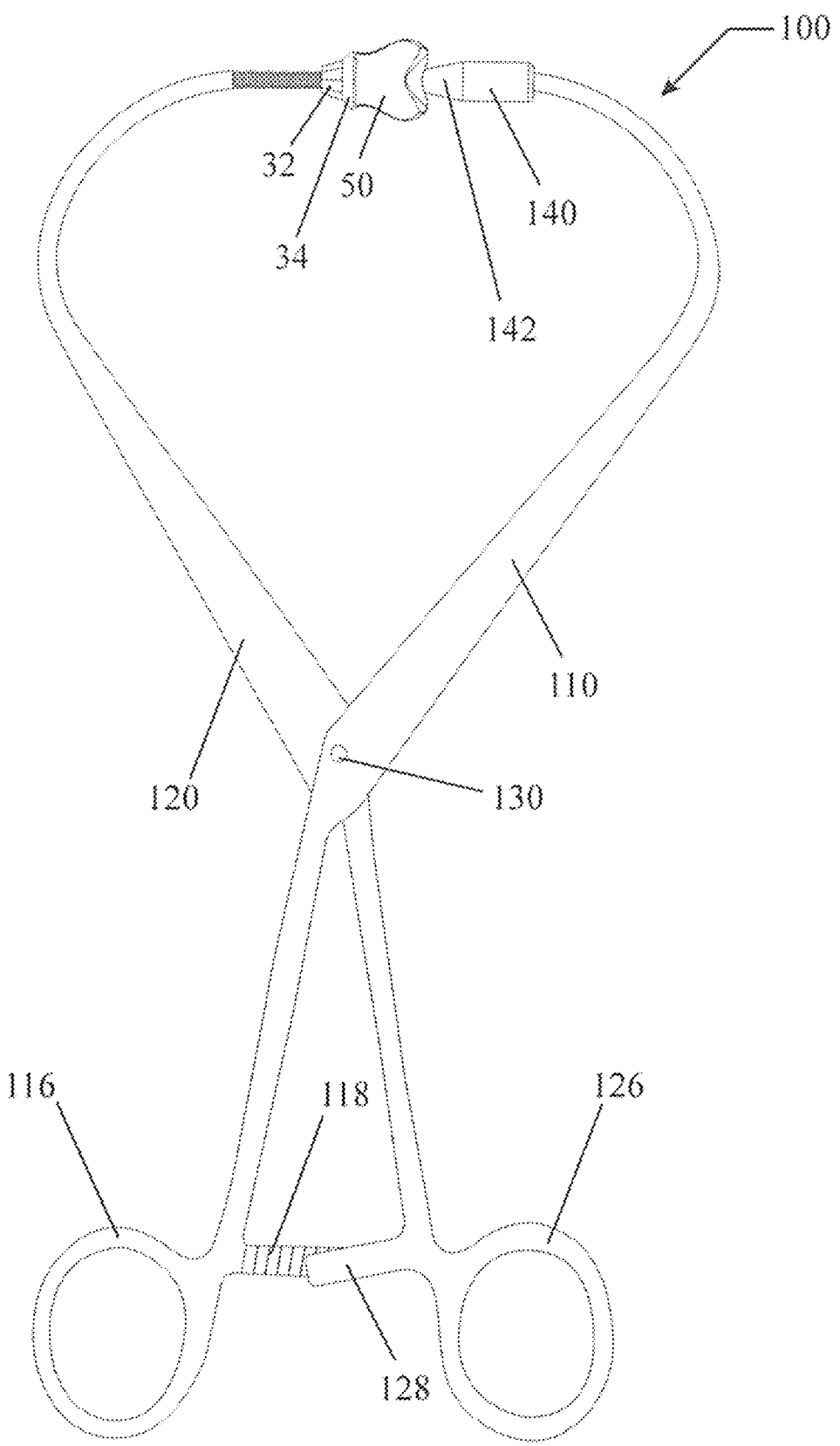
FIG. 22 shows the hemostat tool clamped together with a clamp end of the hemostat tool pressed and locked against the crown mounted on the chimney (ti base) shown in FIG. 21

FIG. 22 shows the first loop grip end 116 and the second loop grip end 126 of the pivoting arms 110, 120 of the hemostat tool clamped together by interlocking the first lock tab 118 with the second lock tab 128 with a clamp end formed from inverted cone shape 142 of driver plug 140 pushing against the top of the crown 50 against the ring shaped ledge base 34 of the chimney (ti base) 30.

The cement can have a fixed setting time usually but not limited to between approximately 3 to approximately 8 minutes. Some cements can be used that are light cured.

Figure 23:
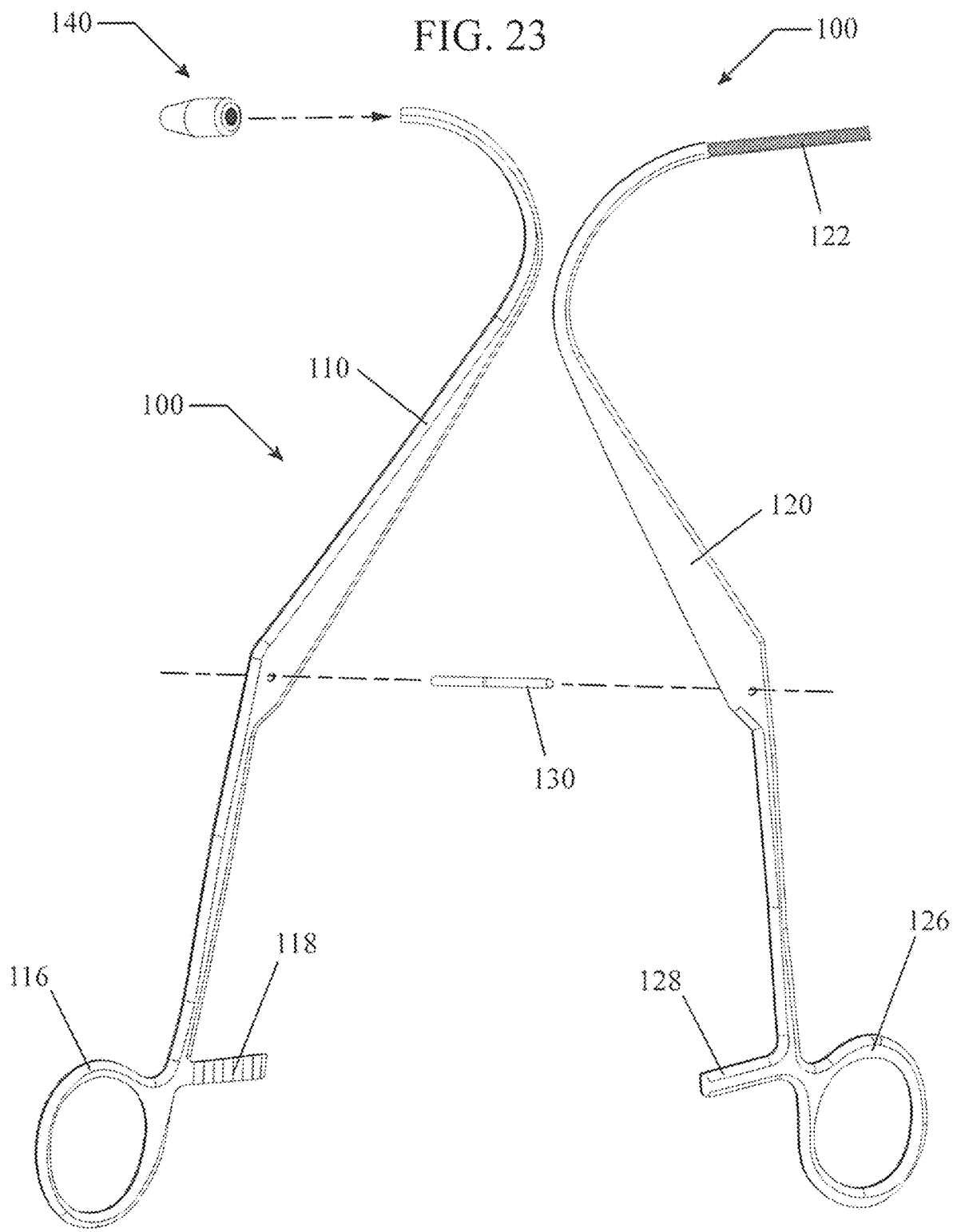
FIG. 23 is an exploded view of the clamp arms of the hemostat tool, pivot pin and detached driver plug of FIGS. 14-17.

FIG. 23 is an exploded view of the clamp arms 110, 120 of the hemostat tool, pivot pin 130 and detached driver plug 140 of FIGS. 14-17.

Figure 24:
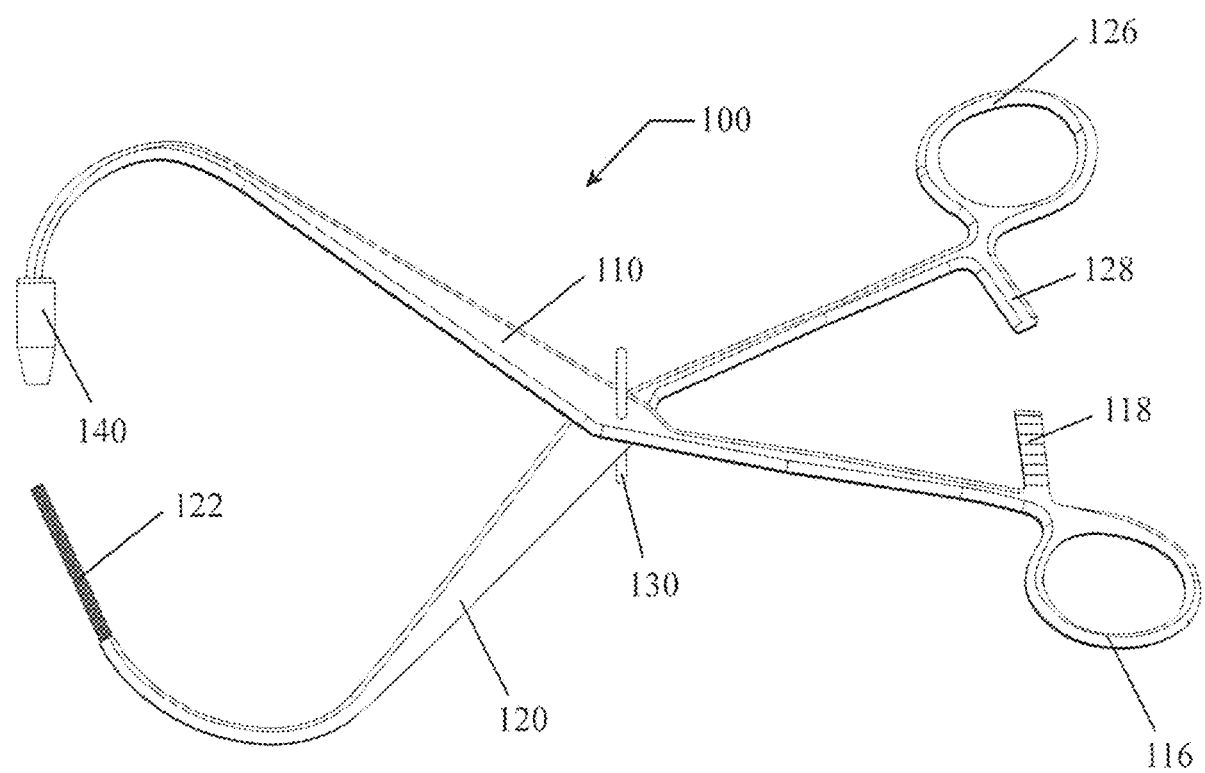
FIG. 24 is an assembled view of FIG. 23 with the clamp arms of the hemostat tool attached to one another with the pivot pin and attached driver plug.

FIG. 24 is an assembled view of FIG. 23 with the clamp arms 110, 120 of the hemostat tool attached to one another with the pivot pin 130 and attached driver plug 140.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of assembling a screw-retained crown which is assembled and visually inspected and verified with a 360 degree view before fixation in a jaw, comprising the steps of:
   providing a titanium (Ti) base having a through-hole therethrough;
   providing a crown having a through-hole cavity therethrough;
   providing a handle having an upper end;
   providing a threaded rod;
   securing one end of the threaded rod to the upper end of the handle;
   mounting the Ti base over another end of the threaded rod;
   providing a driver tool having an elongated member having an inverted-cone shaped lower end, and a threaded socket in the lower end; and
   securing the crown to the mounted Ti base with the driver tool and cement; and
   visually verifying and inspecting the screw-retained crown with a 360 degree view so a dentist or dental technician can verify and inspect the assembled screw-retained crown before anchoring into the jaw.

2. The method of claim 1, wherein the step of providing the Ti base includes the steps of:
   providing the Ti base has an inverted cone shape with a ring-shaped base,
   providing a bottom-extending end from the ring-shaped base;
   providing an upwardly-extending chimney portion from the ring-shaped base;
   providing a hollow interior through the Ti base.

3. The method of claim 2, wherein the step of providing the bottom-extending end includes the step of:
   providing the bottom-extending having a hexagonal shape.

4. The method of claim 1, wherein the step of securing the one end of the threaded rod to the upper end of the handle includes the step of:
   threading the one end of the threaded rod into a socket in an upper portion of the handle.

5. The method of claim 1, wherein the step of securing the crown to the Ti base includes the step of:
   applying the cement to a chimney portion of the Ti base;
   securing the crown over the chimney portion of the Ti base;
   screwing the threaded socket of the driver tool to the another end of the threaded rod; and
   cleaning excess cement from the secured crown and the Ti Base.

6. A clampable assembly system for assembling a screw-retained implant crown which is assembled and visually inspected and verified with a 360 degree view before fixation in a jaw comprising:
   a titanium (Ti) base having a through-hole therethrough;
   a crown having a through-hole cavity therethrough;
   a handle having an upper end; and
   a threaded rod extending upward from the handle, wherein the Ti base is fit over the threaded rod, and the crown is fit over the threaded rod and secured to the Ti base;
   cement and a driver tool, both for securing the crown to the Ti base;
   wherein the driver tool includes an elongated member having an inverted-cone shape lower end, and a threaded socket in the lower end;
   wherein the clampable assembly system allows for the secured base and crown combination to be visually inspected and verified with a 360 degree view by a dentist or dental technician before anchoring into the jaw.

7. The clampable system of claim 6, wherein the Ti Base includes:
   an inverted cone shape with a ring-shaped base,
   a bottom-extending end from the ring-shaped base;
   an upwardly-extending chimney portion from the ring-shaped base; and
   a hollow interior through the Ti base.

8. The clampable system of claim 6, further comprising:
   a socket in an upper portion of the handle wherein one end of the threaded rod is threaded into the socket.

9. The clampable system of claim 6, further comprising:
   the cement is applied to a chimney portion of the Ti base, and
   wherein excess cement is cleaned from the secured crown and Ti Base.

10. A method of assembling a screw-retained crown which is assembled and visually inspected and verified with a 360 degree view before fixation in a jaw, comprising the steps of:
   providing an implant abutment having a through-hole therethrough;
   providing a crown having a through-hole cavity therethrough;
   providing a handle having an upper end;
   providing a threaded rod;
   securing one end of the threaded rod to the upper end of the handle;

mounting the implant abutment over another end of the threaded rod;

providing a titanium (Ti) base providing a driver tool with an elongated member having an inverted-cone shape lower end, and a threaded socket in the lower end;

securing the crown to the Ti base with the driver tool and cement; and visually verifying and inspecting the screw-retained crown with a 360 degree view so a dentist or dental technician can verify and inspect the assembled screw-retained crown before anchoring into the jaw.

11. The method of claim 10, wherein the step of providing the implant abutment includes the steps of:

providing the implant abutment with a ring-shaped base having an inverted-cone-shape;

providing a bottom-extending end from the ring-shaped base;

providing an upwardly-extending chimney portion from the ring-shaped base;

providing a hollow interior through the implant abutment.

12. The method of claim 10, wherein the step of securing the crown to the implant abutment includes the step of:

applying the cement to a chimney portion of the implant abutment;

securing the crown over the chimney portion of the implant abutment;

screwing the threaded socket of the driver tool to another end of the threaded rod; and cleaning excess cement from the secured crown and the implant abutment.

13. A clampable system for assembling a screw-retained implant crown which is assembled and visually inspected and verified with a 360 degree view, comprising:

an implant abutment having a through-hole therethrough;

a crown having a through-hole cavity therethrough;

a handle having an upper end; and a threaded rod extending upward from the handle, wherein the implant abutment is fit over the threaded rod, and the crown is fit over the threaded rod and secured to the implant abutment; and cement a driver tool, both for securing the crown to the implant abutment wherein the driver tool includes an elongated member having an inverted-cone shape lower end, and a threaded socket in the lower end;

wherein the clampable assembly system allows for the secured abutment and crown combination to be visually inspected and verified with a 360 degree view by a dentist or dental technician before anchoring into the jaw.

14. The clampable system of claim 13, wherein the implant abutment includes:

a ring-shaped base having an inverted-cone shape;

a bottom-extending end from the ring-shaped base;

an upwardly-extending chimney portion from the ring-shaped base; and a hollow interior through the implant abutment.

15. The clampable system of claim 13, further comprising:

a socket in an upper portion of the handle wherein one end of the threaded rod is threaded into the socket.

16. The clampable system of claim 13, further comprising:

the cement is applied to a chimney portion of the implant abutment, and wherein excess cement is cleaned from the secured crown and implant abutment.

* * * * *